United States Patent
Geraud

(10) Patent No.: US 11,972,419 B2
(45) Date of Patent: Apr. 30, 2024

(54) METHOD FOR AUTHENTICATING PAYMENT DATA, CORRESPONDING DEVICES AND PROGRAMS

(71) Applicant: Banks and Acquirers International Holding, Paris (FR)

(72) Inventor: Remi Geraud, Valence (FR)

(73) Assignee: BANKS AND ACQUIRERS INTERNATIONAL HOLDING, Paris (FR)

(*) Notice: Subject to any disclaimer, the term of this patent is extended or adjusted under 35 U.S.C. 154(b) by 473 days.

(21) Appl. No.: 16/314,166

(22) PCT Filed: Jun. 30, 2017

(86) PCT No.: PCT/EP2017/066362
§ 371 (c)(1),
(2) Date: Dec. 28, 2018

(87) PCT Pub. No.: WO2018/002349
PCT Pub. Date: Jan. 4, 2018

(65) Prior Publication Data
US 2021/0150520 A1    May 20, 2021

(30) Foreign Application Priority Data
Jun. 30, 2016   (FR) ...................................... 1656239

(51) Int. Cl.
*G06Q 20/38*       (2012.01)
*G06Q 20/32*       (2012.01)
*H04L 9/08*        (2006.01)

(52) U.S. Cl.
CPC ..... *G06Q 20/3825* (2013.01); *G06Q 20/3278* (2013.01); *G06Q 20/38215* (2013.01);
(Continued)

(58) Field of Classification Search
CPC ........... G06Q 20/3825; G06Q 20/4016; G06Q 20/3278; G06Q 20/38215; G06Q 20/3823;
(Continued)

(56) References Cited

U.S. PATENT DOCUMENTS 10,311,427 B2 *   6/2019   Sklovsky ............... G06Q 20/32
10,332,087 B2 *   6/2019   Florek ................ G06Q 20/3226
(Continued)

OTHER PUBLICATIONS

Schneier, "Applied Cryptography", 1996.*
(Continued)

*Primary Examiner* — Steven S Kim
(74) *Attorney, Agent, or Firm* — David D. Brush; Westman, Champlin & Koehler, P.A.

(57) ABSTRACT

A method for authenticating at least one piece of data during a payment transaction taking place between a merchant's communications terminal and a user device of the type including transmission, by the communications terminal, of at least one piece of data to be signed, to the user device by using a near field communications wireless data link. The method includes: obtaining the piece of data to be signed; obtaining an identifier of the communications terminal; signing, within a secured processing unit of the communications terminal, by using a key of the communications terminal, the piece of data to be signed and the identifier of the communications terminal, delivering signed pieces of data; transmission of the signed pieces of data to the user device; and reception, from the user device, of a piece of encrypted data establishing the authentication of the signed pieces of data.

4 Claims, 2 Drawing Sheets

(52) U.S. Cl.
CPC ..... *G06Q 20/3823* (2013.01); *G06Q 20/3829* (2013.01); *G06Q 20/388* (2013.01); *H04L 9/0825* (2013.01)

(58) Field of Classification Search
CPC ............. G06Q 20/3829; G06Q 20/388; G06Q 20/204; G06Q 20/352; H04L 9/0891; H04L 9/0894; H04L 9/321; H04L 9/3263; H04L 9/3247; H04L 9/3268; H04L 67/2819; H04L 9/0825
See application file for complete search history.

(56) References Cited

U.S. PATENT DOCUMENTS

| | | | | |
|---|---|---|---|---|
| 11,282,079 B2* | 3/2022 | Sabt | ............... | G06Q 20/385 |
| 11,763,289 B2* | 9/2023 | Yoon | ............... | G06Q 20/3226 |
| | | | | 705/71 |
| 2002/0144117 A1* | 10/2002 | Faigle | ............... | G06Q 20/3829 |
| | | | | 713/169 |
| 2004/0029569 A1* | 2/2004 | Khan | ............... | G06Q 20/327 |
| | | | | 455/414.1 |
| 2009/0030842 A1* | 1/2009 | Hoffman | ............ | G06Q 20/3229 |
| | | | | 705/66 |
| 2013/0013355 A1 | 1/2013 | Fisher et al. | | |
| 2013/0191290 A1* | 7/2013 | Glendenning | ........ | H04L 9/3247 |
| | | | | 705/71 |
| 2014/0032345 A1 | 1/2014 | Moore | | |
| 2014/0181955 A1* | 6/2014 | Rosati | ............... | G06F 21/35 |
| | | | | 726/18 |
| 2014/0222688 A1* | 8/2014 | Haggerty | ........... | G06Q 20/3227 |
| | | | | 705/71 |
| 2014/0258109 A1* | 9/2014 | Jiang | .................... | G06Q 20/341 |
| | | | | 705/41 |
| 2014/0324698 A1* | 10/2014 | Dolcino | ............... | G06Q 20/327 |
| | | | | 705/44 |
| 2015/0256537 A1* | 9/2015 | Chew | ................. | H04W 12/069 |
| | | | | 726/7 |
| 2015/0271652 A1* | 9/2015 | Rapanen | ................ | H04L 51/58 |
| | | | | 455/466 |
| 2015/0278795 A1* | 10/2015 | Jiang | ................. | G06Q 20/3829 |
| | | | | 705/44 |
| 2015/0278809 A1* | 10/2015 | deOliveira | ........... | G06Q 20/382 |
| | | | | 705/64 |
| 2015/0302413 A1 | 10/2015 | Dua | | |
| 2015/0332248 A1* | 11/2015 | Weksler | ............. | G06Q 20/3224 |
| | | | | 705/71 |
| 2016/0086174 A1* | 3/2016 | Koraichi | ............. | G06Q 20/382 |
| | | | | 705/21 |
| 2016/0205078 A1* | 7/2016 | James | .................... | H04L 9/006 |
| | | | | 713/171 |
| 2016/0234176 A1* | 8/2016 | Chu | ........................ | H04L 63/04 |
| 2016/0292676 A1* | 10/2016 | French | ................. | G06Q 20/401 |
| 2016/0309327 A1* | 10/2016 | Grimault | ............. | H04W 12/068 |
| 2017/0091768 A1* | 3/2017 | Yoon | .................. | G06Q 20/3229 |
| 2017/0116603 A1* | 4/2017 | Bogaard | ................ | G06Q 20/12 |
| 2017/0330184 A1 | 11/2017 | Sabt et al. | | |
| 2017/0373844 A1* | 12/2017 | Sykora | ................. | H04L 9/0877 |
| 2018/0034642 A1* | 2/2018 | Kaehler | ................ | H04W 4/80 |
| 2021/0150520 A1* | 5/2021 | Geraud | ............... | G06Q 20/204 |

OTHER PUBLICATIONS

Van Els et al., "The Advanced Computing Systems Association Risks and Potentials of Using EMV for INternet Payments Risks and Potentials of Using EMV for Internet Payments", USENIX Workshop on Smartcard Technology Chicago, May 10, 1999 (May 10, 1999), XP055358695.
Renaud Lifchitz, "Hacking the NFC Credit Cards for Fun and DEbit", Hackito Ergo Sum 2012, Apr. 12, 2012 (Apr. 12, 2012), XP055358533.
Nyberg K. et al., "Message Recovery for Signature Schemes Based on the Discrete Logarithm Problem", Designs, Codes and Cryptography, Kluwer Academic Publishers, Boston, US, vol. 7, No. 1-02, Jan. 1, 1996 (12996-01-01), pp. 61-81, XP000905401.
Machine translation of the European Office Action dated Nov. 19, 2020 for corresponding European Application No. 17733482.8.
Machine translation of the European Office Action dated Nov. 19, 2020 for corresponding European Application No. 17733483.6.
"Next-Gen Payment Processing Architectures", Trend Micro, dated Aug. 1, 2015, XP055750190.
Libert B. et al., "Efficient Signcryption with Key Privacy from Gap Diffie-Hellman Groups", dated Feb. 26, 2004, PKC 2004, pp. 187-200, LNCS 2947, Springer, XP019002835.
Office Action dated Mar. 20, 2020 for corresponding U.S. Appl. No. 16/314,174, filed Dec. 28, 2018.
Notice of Allowance dated Oct. 16, 2020 for corresponding U.S. Appl. No. 16/314,174, filed Dec. 28, 2018.
International Search Report dated Sep. 21, 2017 for corresponding International Application No. PCT/EP2017/066362, filed Jun. 30, 2017.
Written Opinion of the International Searching Authority dated Sep. 21, 2017 for corresponding International Application No. PCT/EP2017/066362, filed Jun. 30, 2017.
English translation of the Written Opinion of the International Searching Authority dated Oct. 2, 2017 for corresponding International Application No. PCT/EP2017/066362, filed Jun. 30, 2017.
International Search Report dated Sep. 21, 2017 for International Application No. PCT/EP2017/066365 filed Jun. 30, 2017.
Written Opinion of the International Searching Authority dated Sep. 21, 2017 for International Application No. PCT/EP2017/066365 filed Jun. 30, 2017.
English Translation of Written Opinion of the International Searching Authority dated Oct. 2, 2017 for International Application No. PCT/EP2017/066365 filed Jun. 30, 2017.

* cited by examiner

METHOD FOR AUTHENTICATING PAYMENT DATA, CORRESPONDING DEVICES AND PROGRAMS

CROSS-REFERENCE TO RELATED APPLICATIONS

This Application is a Section 371 National Stage Application of International Application No. PCT/EP2017/066362, filed Jun. 30, 2017, which is incorporated by reference in its entirety and published as WO 2018/002349 A1 on Jan. 4, 2018, not in English.

1. FIELD OF THE INVENTION

The present technique relates to the securing of data exchanged by means of a contactless data-transmission protocol. The technique relates more particularly to an NFC-type data transmission in which a transmission is made between a first device and a second device separated by a maximum distance of about 10 cm. The technique cannot be applied and is not intended for application to WiFi, WiMax and LTE type data transmission techniques, for which the transmission technologies are different.

2. PRIOR ART

Many devices used in daily life are capable of communicating and exchanging data with each other. To this end, an increasing proportion of these devices use data-exchanging protocols called near-field communications protocols, or again NFC protocols. Sometimes, these data-transmission techniques are also called RFID techniques. This name is incorrect since the abbreviation NFC stands for "near field communication" while RFID relates to "radio-frequency identification" means. Both systems use radio signals for all sorts of purposes of location and tracking, and occasionally replace barcodes. Both use short-range data transmission means.

Now, the use of this type of technology causes apprehension and raises questions on the part of users. Many users place little confidence or no confidence at all in these technologies, especially when using them to process personal and/or confidential data. This is the case for example with payment. Contactless payment devices have appeared relatively recently. These are for example contactless payment cards through which payment (the amount is generally capped) is made by placing the card on a compatible payment terminal or bringing it close to the terminal. These are also communications terminals which also integrate contactless chips: these contactless chips offer data-exchanging capacities to communications terminals, and these capacities can be used to make payments, somewhat as if the communications terminal were imitating the behavior of a contactless payment card. There are many rumors, often baseless, suggesting that contactless communications or payments are unreliable. It is also often reported that these devices are unreliable in themselves and that the data contained in these devices can be retrieved without the user's knowledge or against his wishes. Although these rumors are often baseless, there are nevertheless risks during data transmission between the devices involved (cards, communications terminals, payment terminals) and especially during the transmission of payment data. The risks however do not arise out of the technology (NFC) used per se but generally from the user himself. Thus, for example, in the case of a communications terminal using the NFC interface to make a payment, it is possible that the user will have installed an unreliable application or even a malicious application aimed at using payment data for fraudulent purposes. The situation is the same with the merchant's terminal.

For example, in the context of communications between a user device (a smartphone type communications terminal) and a payment terminal, especially using NFC protocols for payment, it is necessary for the device and the terminal to authenticate data. For this purpose, the device implements an authentication protocol with the terminal (for example a payment terminal, a merchant's terminal or any other appropriate device). The terminal checks that the authentication phase has been successful and if not, rejects the transaction and triggers an alert or implements any other behavior deemed to be appropriate in such a situation.

In typical scenarios, the terminal carrying out these checks is a secured device (such as a payment terminal). It has been designed to prevent most possible types of intrusion both hardware and software. However, if the payment terminal is a third-party device (a communications terminal of the tablet, smartphone or screen type), then the security of this (third-party) communications terminal is not guaranteed and nor is the origin of the applications installed in this terminal (by the merchant himself). If the merchant is not vigilant, it can happen that the applications installed on this terminal are fraudulent.

Here below, we present a case of possible dysfunction implemented during a payment between a communications terminal and a user device. The designation "V" is applied to the verifier (for example the merchant's terminal or apparatus) and "P" designates the tester (user's device: smartphone, tablet.

The payment protocols usually work as follows during the transaction: V asks P to digitally sign data. P signs the data in compliance with V's request and transmits the signed data to V. This signature is verified by V and, if it is correct, then the transaction is accepted and transferred to the rest of the payment processing sequence. Such a procedure is called a challenge-and-response procedure and is used for example in EMV applications.

The problem that that the invention proposes to remedy is the following: if V works with a non-secured device (i.e. a tablet type terminal, PC or the like, to which payment functions have been attached) that is infected by a malicious software (installed by the merchant or by a ill-intentioned third party), then this software can misuse the customer's terminal P. Such misuse can for example take the form of a sequence of (invisible) transactions. This can be done for example when the merchant's terminal forces the user's device to sign arbitrary messages. The user's device, which is in "enslaved" position, is then obliged to sign this data. The malicious software installed on the merchant's terminal then uses this signed data to create fraudulent transactions.

This is the paradox of these cryptographic operations: it is certain that the processing operations carried out are right (because they implement cryptographic processing operations). However, the use that is made of the results of these cryptographic processing operations cannot be guaranteed.

3. SUMMARY

The invention does not present these prior art problems. More particularly, the invention provides a simple solution to the problems and issues identified here above. This solution is entirely compatible with existing hardware devices.

More particularly, the invention proposes a method for authenticating at least one piece of data, a method implemented during a payment transaction taking place between a merchant's communications terminal and a user device, a method of the type comprising the transmission, by the communications terminal, of at least one piece of data to be signed to the user device by means of a near field communications wireless data link.

Such a method comprises:
- a step for obtaining said piece of data to be signed;
- a step for obtaining an identifier of said communications terminal;
- a step of signing, by means of a key of said communications terminal, of said piece of data to be signed and of said identifier of the communications terminal, delivering a pair of signed pieces of data;
- a step of transmission of the pair of signed pieces of data to said user device; and
- a step of reception, from said user device, of a piece of encrypted data establishing the authentication of said pair of signed pieces of data.

Thus, by signing the data that it transmits to the user device, the communications terminal certifies the origin of this data and therefore enables the user device to verify the origin of the data it receives.

According to one particular characteristic, the method comprises the following steps subsequently to said step for receiving a piece of encrypted data coming from said user device:
- a step of decryption, by means of said secured processing unit of said communications terminal, of said piece of encrypted data delivering a piece of signed data;
- a step for verifying the validity of said piece of signed data in relation to a piece of reference data.

Thus, the method enables the merchant's terminal to verify that it is not itself the victim of an attempt at fraud on the part of the user device. There is thus a bilateral reinforcement of the security of the near field transaction.

According to one particular characteristic, said piece of reference data is equal to said piece of data to be signed.

Thus, there is uniformity of the data exchanged between the communications terminal and the user device: since the communications terminal already possesses the piece of data to be signed, it is easy to verify that the piece of data that it receives from the user device is correct.

According to one particular characteristic, subsequently to the step of verification of the validity of said piece of signed data in relation to the piece of reference data, if a positive result is delivered, the method comprises a step of transmission, by the communications terminal, of said piece of signed data to a system for the processing of payment transactions.

Thus, when the authentication of the data is properly done, the payment transaction is implemented.

According to one particular embodiment, said signing step comprises:
- a step of transmission of said piece of data to be signed and/or said identifier of the communications terminal to a secured processing unit of said communications terminal by a general processing unit of said communications terminal;
- a step of signing, by said secured processing unit, using said key of the communications terminal, of said piece of data to be signed and/or said identifier of the communications terminal, respectively delivering a piece of signed data and/or a signed identifier;
- a step of transmission of said piece of signed data and/or of the signed identifier to said general processing unit of said communications terminal.

Thus, the production of the data transmitted to the user device is secured by preventing this data from being forged by other applications present on the communications terminal.

According to one particular embodiment, said key of the communications terminal is a private key belonging a {private key; public key} pair.

Thus, greater security is ensured by using a public-key architecture.

According to one particular embodiment, the method comprises the following steps within the user device, between the step for transmitting the pair of signed data and the step for receiving the encrypted data:
- a step of reception of the pair of signed data by the user device;
- a step of verification, by means of a key, of the signature of the data of the pair of pieces of signed data; and when the signature of the pair of pieces of signed data is correct:
- a step of signing, by means of a signature key tk, of at least one of the pieces of data previously received from the merchant's terminal, delivering a piece of signed data;
- a step of encryption of said piece of signed data by means of an encryption key delivering the piece of encrypted data;
- a step of transmission of the piece of encrypted data to the merchant's terminal.

According to another aspect, the invention also relates to a communications terminal comprising a general processing unit, a memory. Such a terminal comprises a secured processing unit and a secured memory and at least one reconfigurable circuit for processing payment transactions with a user terminal, comprising especially an authentication of a piece of data, said communications terminal comprising:
- means for obtaining a piece of data to be signed;
- means for obtaining an identifier of said communications terminal;
- means of signing, by means of a key of said communications terminal, of said piece of data to be signed and said identifier of the communications terminal, delivering a pair of pieces of signed data;
- means of transmission of the pair of pieces of signed data to said user device; and
- means of reception, from said user device, of a piece of encrypted data establishing the authentication of said pair of signed data.

According to another aspect, the technique also relates to a user terminal that comprises means for implementing the method as described here above.

According to a preferred implementation, the different steps of the methods according to the invention are implemented by one or more software programs or computer programs comprising software instructions that are to be executed by a data processor of a relay module according to the proposed technique, these programs being designed to control the execution of different steps of the methods.

The invention is therefore also aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The invention is also aimed at providing an information carrier or medium readable by a data processor, and comprising instructions of a program as mentioned here above.

The information medium can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive.

Furthermore, the information medium can be a transmissible medium such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component as to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, a smart card, a memory card, an electronic board for the execution of firmware etc.

Each component of the system described here above can of course implement its own software components.

The different embodiments mentioned here above can be combined with one another to implement the proposed technique.

4. FIGURES

Other features and advantages of the invention shall appear more clearly from the following description of a preferred embodiment, given by way of a simple illustratory and non-exhaustive example and from the appended drawings, of which!

Figure 4:
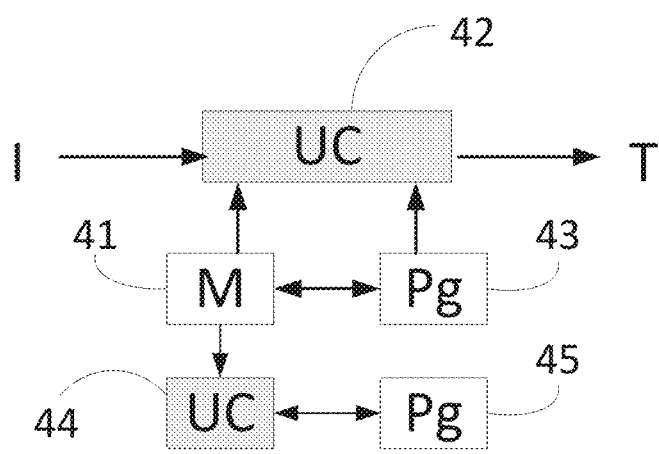

FIG. 4 schematically describes a user device according to the present invention.

5. DESCRIPTION

5.1. General Principle

As explained here above, the general principle of the invention consists especially in integrating one or more additional constraints into the "challenge-response" scheme. The present invention proposes a protocol modification that makes it possible to withstand attacks by terminals comprising malicious software. Secondarily, this protocol modification also protects the terminals of the merchants themselves against unsolicited responses coming from other apparatuses (i.e. malicious apparatuses that might try to attack an authentic merchant's terminal). This protocol modification thus offers an additional layer of protection against other types of attacks (DoS or "Denial of Service", Concurrency Attacks, etc.).

Thus, when a payment transaction is made between a merchant's terminal and a user device, a challenge-response type process is implemented so that the merchant's terminal identifies (authenticates) the user device (and vice versa). It is assumed that the merchant's terminal (it is a telephone, a tablet or a PC) is not secured as such but has securing resources. These securing resources can for example take the form of a "Secure Element—SE" or a "Trusted Execution Environment—TEE" or again another dedicated hardware or software component. It is assumed, for the explanations that follow, that the payment application of the merchant's terminal is called TPC and that it comprises a verification (identification) module called V (it is for example an SE, a TEE or more generally a secured processing unit). It is also assumed that there is a payment application on the user's device DU and that the user's device (DU) comprises a proof module (to confirm identity) called P (it is for example an SE, a TEE or more generally a secured processing unit). In another embodiment, the user device can be a classic payment card in which protocol and hardware modifications are made enabling the present technique to be implemented.

During the joint implementation of the payment applications TPC and DU, the method implemented is generally the following:
- the authentication data transmitted by V to P (i.e. the "challenge" data) are signed digitally by V itself.
- the response transmitted by P is encrypted in such a way that only V can verify its validity.

In order to enable such an implementation, it is enough to provide V with a (public) key that is known to P.

The underlying logic of this method is that P is purely and simply unaware of the signature requests that do not come directly from the secured part of V (i.e. for example from the "secure element" to which V has access or from the trusted environment to which V has access): it is assumed indeed that only this architecture is capable of carrying out a valid digital signature of the challenge before it is transmitted to P.

There is a reason for which this assumption is made: the inventors have had the idea of making the key (for example public key) of a signature (of V) directly accessible to the securing resources of the merchant's terminal. In one embodiment for example, the securing resources keep this key and they make it accessible to only a limited number of trusted applications (for example only one application: the payment application installed on the merchant's terminal). Besides, the "secure element" itself carries out the encryption operations on behalf of the payment application of the merchant's terminal. Thus, in the first step, before the transmission of the challenge to the user's communications terminal, the challenge is signed by the securing resources by using the key of V (the key of the payment application). According to one particular characteristic, this key is a public key.

In addition, the fact that the response transmitted by P is encrypted makes it possible to guard against situations in which a fraudulent individual will detect and re-play the valid authentication traces (known as attack by replay). The attack can be implemented as much by a malicious application installed on the merchant's device as by a malicious application installed on the customer's device.

Figure 1:
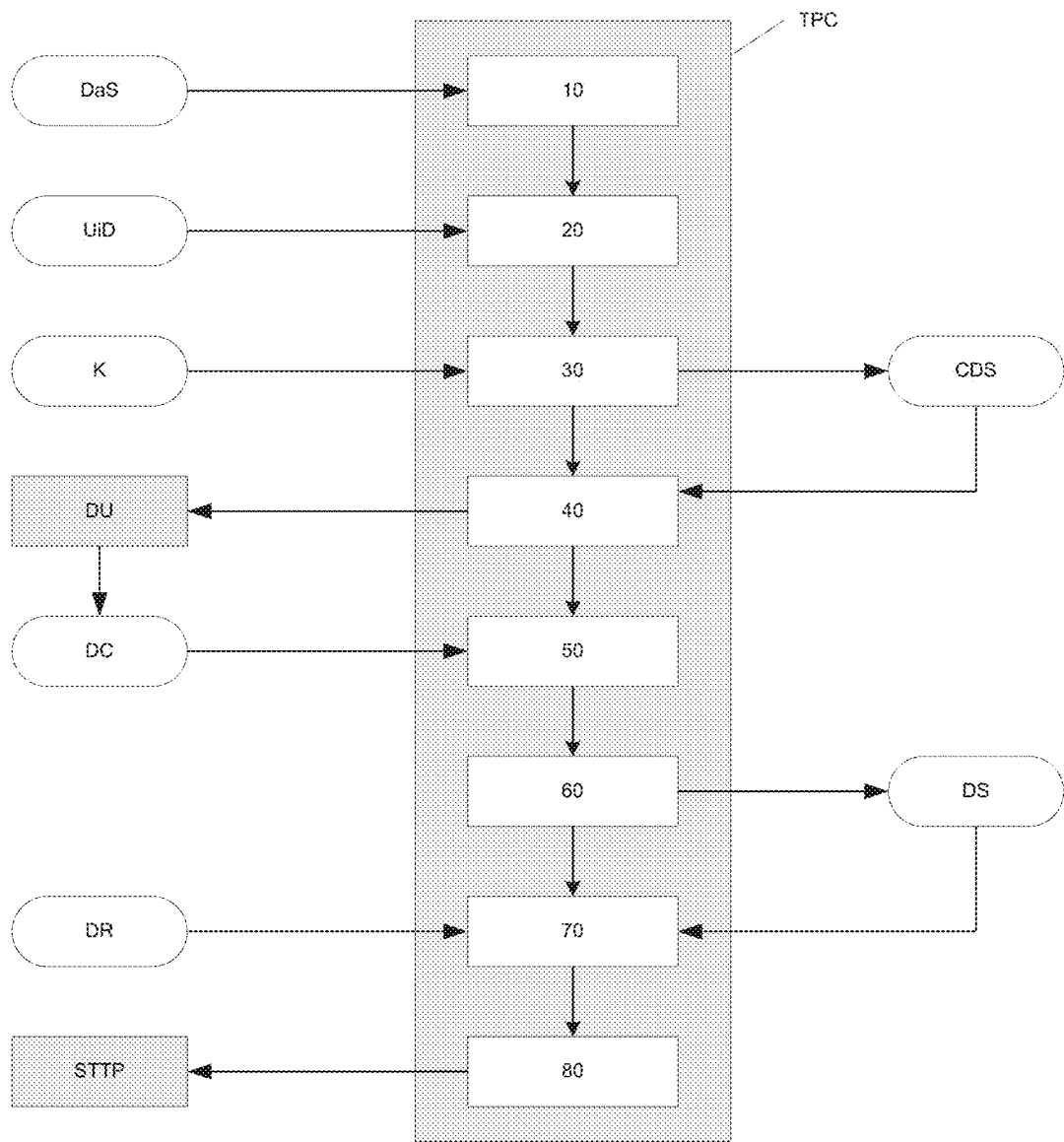
FIG. 1 is a block diagram of the proposed technique authenticating data transmitted between a merchant's communications terminal and a user device.

Referring to FIG. 1, a description is given of the proposed technique authenticating data transmitted between a merchant's communications terminal and a user device. It may be recalled that it is sought to make sure that the user device signs only data coming legitimately from the merchant's communications terminal (acting as a payment terminal). The technique thus comprises:

- a step (10) for obtaining the data to be signed (DaS);
- a step (20) for obtaining an identifier of the communications terminal (UiD);
- a signing step (30), using a key (K) of the communications terminal, for signing the data to be signed (DaS) and the identifier of the communications terminal (UiD), delivering
- a pair of pieces of signed data (CDS);
- a step for transmitting (40) the pair of pieces of signed data (CDS) to the user device; and
- a step (50) for receiving, from the user device, a piece of encrypted data (DC) establishing the authentication of the pair of pieces of signed data.

Indeed, according to the present disclosure, the fact of receiving a piece of encrypted data coming from the user device endorses the fact that the pair of data signed has truly been authenticated by the user device. This is practical because it is not necessary to transmit an acknowledgement of reception or a specific confirmation of authentication. Thus the exchanges are reduced. If there is no response from the user device, it can be deduced that the data transmitted are erroneous (that there is an error of reception of the data transmitted for example). For its part, the user device verifies the signature of the data transmitted and transmits no response if there is no authentication.

If the user device responds, then the procedure continues with a verification of the data received from the user device, and it comprises:

- a step of decryption (60), by the secured processing unit of the communications terminal, of the encrypted data (DC), delivering a piece of signed data (DS);
- a step of verification (70) of the validity of the signed data (DS) relative to a piece of reference data (DR);
- a step of transmission (80), by the communications terminal, of the piece of signed data (DS) to a payment transaction processing system (SUP).

These three last steps enable the merchant's terminal not to be duped by data arbitrarily "replayed" by the user device that would itself be fraudulent.

Thus, the procured solution possesses the advantage of protecting the user's device (and the user himself) against fraudulent requests for signatures and of protecting the merchant against attempts at wrongful use received from the user device. The advantage is therefore twofold because of the bilateral protection.

Depending on the embodiments, the keys used for the signature and the encryption can be either pairs of public/private keys or symmetrical keys serving both for encryption and decryption.

Figure 2:
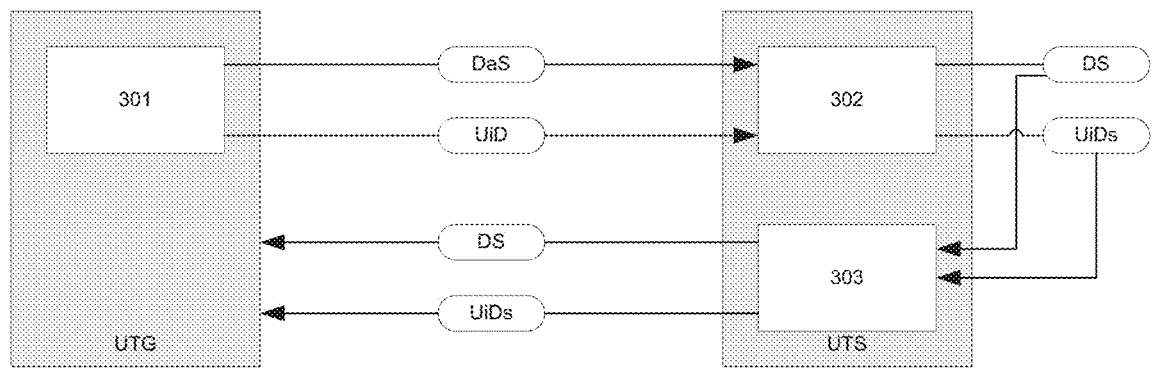
FIG. 2 is a block diagram of the proposed technique performing a signature of data within the merchant's communications terminal.

Referring to FIG. 2, we now describe the proposed technique for carrying out a signing of data within the merchant's communications terminal. This technique comprises:

- a step of transmission (301), of said data to be signed (DaS) and/or said identifier of the communications terminal (UiD) to a secured processing unit (UTS) of said communications terminal by a general processing unit (UTG) of said communications terminal;
- a step of signing (302) by said secured processing unit, by means of said key of the communications terminal (K), of said data to be signed (Das) and/or said identifier (UiD) of the communications terminal, respectively delivering a piece of signed data DS) and/or a signed identifier (UiD);
- a step of transmission (303) of said one piece of signed data (DS) and/or of the signed identifier (UiDs) to said one general processing unit of said communications terminal.

5.2. Description of One Embodiment

In this purely illustrative embodiment, it is assumed, for greater simplicity, that RSA type signature and encryption mechanisms are being used (both on the merchant's terminal side and on the user device side). In this embodiment it is assumed that, prior to the implementation of the secured exchange protocol, two installation phases have been carried out: one on the merchant's terminal side and one on the user device side.

5.2.1. Phase of Installation on the Merchant's Terminal Side

The merchant's terminal is provided with a private key sk. This provision of a private key can be done at any time. It is assumed that this private key sk is generated according to known prior art techniques and that it is placed within a secured resource of the merchant's terminal. Ideally, this private key is placed within a TEE (acting as a secured processing unit) of the merchant's terminal. A unique identifier (uid) is also available to the merchant's terminal. This unique identifier (uid) is generated and signed (for example by the operator of the payment application). The payment application is also installed on the merchant's terminal. These elements (payment application, private key sk and unique identifier uid) can ingeniously be installed at the same time on the merchant's terminal by means of a secured installation process (which can be implemented either online or on site by an accredited technician for example).

Ultimately, the public key pk (corresponding to the private key sk) is made available in a database, with the unique identifier uid in order to form a pair {public key pk; unique identifier uid}. The pair {pk; uid} is the object of a signature (for example by the operator of the payment application if it is this operator that has signed the unique identifier uid).

In one specific embodiment, the installation phase is carried out during the installation of a payment application on a merchant's communications terminal (of a smartphone, tablet or computer type), said communications terminal being equipped with a TEE and/or an SE (also called a module V). This embodiment has the advantage in that there is no need to communicate a private key sk to the communications terminal as such: this piece of data is communicated only to the SE or to the TEE. Thus, it is made sure that the communications terminal (and above all any fraudulent applications of this terminal) cannot have access to this private key.

5.2.2 Phase of Installation on the User Device Side

The user device, which is for example a communications terminal of the smartphone or tablet type, is also equipped with an SE or a TEE (acting as a secured processing unit). It may be recalled that, in this embodiment, the customer wishes to make payment with his device. This device therefore has the data needed for making a payment. It may, in one specific embodiment, be bank card data (bearer's name, PAN card number, date of validity, verification code). It may also be other data, depending on the embodiment.

In the context of the present technique, the installation phase consists of the deposition, in the SE or the TEE of the user's device (also called the module P), of the signature key tk, that is used to do a signature of the signed data (data and uid) transmitted by the merchant's terminal after the user device has verified the validity of the signatures appended by the merchant's terminal.

This installation can typically be implemented by the installation of a payment application, as is the case with the payment application installed on the merchant's terminal.

One advantageous possibility is to install this signature key at the same time as a bank application: for example the customer's bank application. Indeed, with the development of bank applications (applications that enable the management of accounts from a smartphone or a tablet), a worthwhile solution both for the customer and for the bank can be to have a bank application that also enables the making of payments. In this case, the data needed for payment are not necessarily bank card data but can be data specifically prepared by the banking application of the bank, or even specifically prepared, at the time of payment, by the financial establishment itself (i.e. by a server to which the customer's bank application is connected).

To make a payment, in this particular case, the customer opens his bank application; selects the fact that he wishes to make a payment; enters a confidential code if any (or authenticates himself for example by biometric means) and places his device on the merchant's terminal. The bank application reacts to the requests from the merchant's terminal (as explained in the present application) and the payment is made. For the bank, as for the customer, the benefits are real both in terms of security of the transaction (made by the bank application) and in terms of loyalty of the customer (who is no longer required to make payment with a third-party application for which he does not have a guarantee, for example with regard to security and confidentiality of the data transmitted and processed).

5.2.3. Execution of the Exchange of Authentication Data

In this embodiment, the authentication is implemented as follows:

the merchant's terminal (or the module V) transmits the pair $\{[uid]_{sk}, [data]_{sk}\}$ to the user's device (or the module P); the pair of data $\{[uid]_{sk}, [data]_{sk}\}$ includes $[uid]_{sk}$ which is the unique identifier signed with the key sk and data $[data]_{sk}$ also signed with the key sk; as an alternative, to shorten the processing time, the pair can be directly signed (with only one single signature instead of two signatures);

the user's device (or the module P) uses the unique identifier uid to obtain the public key pk; for example it downloads this public key into a dedicated server or again it searches for this key in an internal database (for example a text file or an xml file) given by the payment application;

the user's device (or the module P) uses the public key pk to verify the validity of the uid signature and data signature; in the event of an error on either of these signatures (for example uid unencrypted is not the uid possessed by the customer), then the customer stops the process (and does not respond to the merchant's terminal;

when both signatures are correct (and when it can be deduced from this that they have been made by the merchant's terminal), the user's device continues the processing operation in signing the data [data] with the key tk and encrypting this signed data with the public key of the merchant's terminal pk: $Enc_{pk}([data]_{tk})$; then it transmits this data to the merchant's terminal;

the merchant's terminal takes delivery of the data coming from the user's device, then decrypts this data by means of its private key sk, and verifies the signature of the data. If the signature of the data is incorrect, then the process is stopped; if not the signature is transmitted to the payment processing network.

Thus, the authentication of data transmitted during a payment operation between a merchant's terminal and a user device in using near field communications (NFC) makes it possible to validate a transaction in a secured manner.

5.3. Other Characteristics and Advantages

Figure 3:
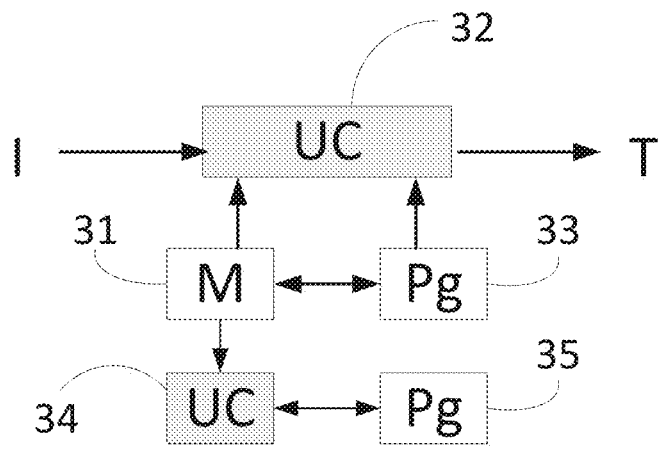
FIG. 3 is a schematic representation of the merchant's communications terminal according to the present invention.

Referring to FIG. 3, we describe a communications terminal implemented to carry out an authentication of data in the context of a payment process according to the method described here above.

For example, the communications terminal, acting as a payment terminal, comprises a memory 31 comprising especially a buffer memory, a general processing unit 32 equipped for example with a microprocessor and managed by a computer program 33, and a secured processing unit 34 (denoted as V here above), managed by a computer program 35, these processing units implementing the method of authentication as described here above to make a payment with a merchant.

At initialization, the code instructions of the computer program 35 are for example loaded into a memory and then executed by the processor of the secured processing unit 34. The processing unit 34 inputs at least one piece of data to be authenticated. The microprocessor of the secured processing unit 34 implements the steps of the method of authentication according to the instructions of the computer program 35 to give the general processing unit 32 a piece of signed data and, if necessary, a piece of data representing the identifier of the communications terminal (which itself is also signed). The general processing unit 32 carries out a processing of this data to transmit it to a customer's device (for example a smartphone, a tablet) within the framework of a payment transaction.

To this end, the communications terminal comprises, in addition to the buffer memory 31, communications means such as network communications modules, data transmission means and data transmission circuits for transmission between the various components of the communications terminal.

These means can take the form of a particular processor implemented within the communications terminal. According to one particular embodiment, this device implements a specific application that is in charge of carrying out the transactions, this application being, for example, provided by the manufacturer of the processor in question in order to enable the use of said processor or by a provider of payment solutions for the "open" terminals. To this end, the processor comprises unique identification means. These unique identification means make it possible to ensure the authenticity of the processor.

Besides, the device furthermore comprises near field communications means, called NFC, and means of transmission and reception of data coming from the communications network. These means also take the form of communications interfaces enabling exchanges of data on communications networks, interrogation means and means of updating databases.

Referring to FIG. 4, we describe a user device implemented to carry out an authentication of data within the framework of a payment process, according to the method described here above.

For example, the user device comprises a memory 41, constituted by a buffer memory, a general processing unit 42, equipped for example with a microprocessor and managed by a computer program 43, and a secured processing unit 44 (denoted as P here above), managed by a computer program 45, these processing units implementing the method of authentication as described here above to make a payment to the merchant.

At initialization, the code instructions of the computer program 45 are for example loaded into a memory and then executed by the processor of the secured processing unit 44. The secured processing unit 44 inputs at least one piece of data to be authenticated (data signed by the communications terminal) coming from the general processing unit. The microprocessor of the secured processing unit 44 implements the steps of the authentication method, according to the instructions of the computer program 45 to provide the general processing unit 42 with at least one piece of non-signed data. The general processing unit 42 carries out a processing of this data in order to, on the one hand, compare reference data and the data coming from the removal of the signatures and then, if this data is correct, to transmit at least one amongst these pieces of data to the secured processing unit to make a signature of this piece of data with a signature key and encrypt this new piece of signed data with a key of the communications terminal. The secured processing unit transmits this data to the general processing unit which again transmits it to the merchant's communications terminal (for example a smartphone, a tablet).

To this end, the user device comprises, in addition to the buffer memory 41, communications means such as network communications modules, data transmission means and data transmission circuits for transmission of data between various components of the user device.

These means can take the form of a particular processor implemented within the user device. According to one particular embodiment, this device implements a specific application that is in charge of the performance of transactions, this application being provided for example by the manufacturer of the processor in question in order to enable the use of said processor or by a provider of payment solutions for "open" terminals. To this end, the processor comprises unique identification means. These unique identification means ensure the authenticity of the processor.

Besides, the device furthermore comprises near field communications means, called NFC, and means of transmission and reception of data coming from the communications network. These means also take the form of communications interfaces enabling exchanges of data on the communications networks, interrogation means and means for updating databases.

The invention claimed is:

1. A contactless payment method between a communications terminal of a merchant and a user device communicating through a near field communication (NFC) wireless data link, the method comprising:
    obtaining payment data by a general processing unit of the communication terminal;
    obtaining, by the general processing unit, an identifier of the communications terminal;
    transmitting, by the general processing unit, the payment data and the identifier of the communications terminal to a secured processing unit of the communication terminal;
    generating, by the secured processing unit, a pair of signed data by signing the payment data and the identifier of the communication terminal, using a private key of a pair of private and public keys of the communication terminal;
    transmitting, by the secured processing unit, the pair of signed data to the general processing unit;
    transmitting, by the general processing unit, the pair of signed data to the user device using the NFC wireless data link;
    receiving, by the general processing unit through the NFC wireless data link, from said user device, encrypted data establishing authentication of the pair of signed data;
    decrypting, by the secured processing unit, the encrypted data to provide decrypted signed data;
    comparing, by the secured processing unit, the decrypted signed data with the pair of signed data to verify the validity of the pair of signed data; and
    when the pair of signed data is valid, transmitting, by the communication terminal, the pair of signed data to a payment transaction processing system, wherein the pair of signed data is not transmitted to the payment transaction processing system when the pair of signed data is not valid.

2. The method of according to claim 1, comprising, within the user device, between the transmission of the pair of signed data and the reception of the encrypted data:
    receiving the pair of signed data by the user device;
    verifying, by the user device, the signature of the pair of signed data, using a public key of the pair of private and public keys; and
    when the signature of the pair of signed data is correct:
    signing, using a signature key, payment data and the identifier of the communication terminal to generate the pair of signed data;
    encrypting the pair of signed data by using an encryption key to generate the encrypted data; and
    transmitting the encrypted data to the communications terminal, wherein the encrypted data is not transmitted by the user device to the communication terminal when the signature of the pair of signed data is not correct.

3. A communications terminal of a merchant for communicating with a user device through a near field communication (NFC) wireless data link, the communication terminal comprising:
    a general processing unit;
    a memory;
    a secured processing unit; and
    a secured memory;
    wherein the communication terminal is configured to:
    obtain payment data by the general processing unit of the communication terminal;
    obtain, by the general processing unit, an identifier of the communication terminal;

transmit, by the general processing unit, the payment data and the identifier of the communication terminal to a secured processing unit of the communication terminal;

generate, by the secured processing unit, a pair of signed data by signing the payment data and the identifier of the communication terminal, using a private key belonging to a pair of private and public keys of the communication terminal;

transmit, by the secured processing unit, the pair of signed data to the general processing unit;

transmit, by the general processing unit, the pair of signed data to the user device using the NFC wireless data link;

receive, by the general processing unit through the NFC wireless data link, from said user device, encrypted data establishing authentication of the pair of signed data;

decrypt, by the secured processing unit, the encrypted data to provide decrypted signed data;

compare, by the secured processing unit, the decrypted signed data with the pair of signed data to verify the validity of the pair of signed data; and when the pair of signed data is valid, transmit, by the communication terminal, the pair of signed data to a payment transaction processing system, wherein the pair of signed data is not transmitted to the payment transaction processing system when the pair of signed data is not valid.

4. A non-transitory computer readable medium comprising a computer program product stored thereon, which comprises program code instructions which, when executed by a communications terminal of a merchant for communicating with a user device through a near field communication (NFC) wireless data link, implement a payment method comprising:

obtaining payment data by a general processing unit of the communication terminal;

obtaining, by the general processing unit, an identifier of the communication terminal;

transmitting, by the general processing unit, the payment data and the identifier of the communication terminal to a secured processing unit of the communication terminal;

generating, by the secured processing unit, a pair of signed data by signing the payment data and the identifier of the communication terminal, using a private key belonging to a pair of private and public keys of the communication terminal;

transmitting, by the secured processing unit, the pair of signed data to the general processing unit;

transmitting, by the general processing unit, the pair of signed data to the user device using the NFC wireless data link;

receiving, by the general processing unit through the NFC wireless data link, from said user device, encrypted data establishing authentication of the pair of signed data;

decrypting, by the secured processing unit, the encrypted data to provide decrypted signed data;

comparing, by the secured processing unit, the decrypted signed data with the pair of signed data to verify the validity of the pair of signed data; and when the pair of signed data is valid, transmitting, by the communication terminal, the pair of signed data to a payment transaction processing system, wherein the pair of signed data is not transmitted to the payment transaction processing system when the pair of signed data is not valid.

* * * * *